United States Patent Office 2,734,893
Patented Feb. 14, 1956

2,734,893

SAPONIFICATION OF "POPCORN" POLYMERS

Norman M. Wiederhorn and Theresa L. MacDonald, Beverly, and Wilson M. Kleibacker, Salem, Mass., assignors to United Shoe Machinery Corporation, Flemington, N. J., a corporation of New Jersey No Drawing. Application October 20, 1951, Serial No. 252,396

3 Claims. (Cl. 260—93.5)

This invention relates to the manufacture of polymers and particularly to a process for obtaining an improved yield of very high molecular weight linear polymers.

Long chain linear polymeric materials possess many desirable properties including toughness and strength and considerable effort has been expended to the development of processes for making them. In general, polymerization to form long chains has necessitated extremely careful control of reaction conditions and almost universally an extremely low reaction rate since it has been found that higher reaction rates in general tend to produce relatively low molecular weights molecules. Control of reaction rate to obtain very high molecular weight polymers through the use of low concentrations of catalyst has involved the difficulty of extremely low rates of polymerization.

A difficulty encountered in continuous polymerization methods has been the formation of the so-called popcorn polymer. This polymer is formed by a catalyst seed which develops spontaneously within the polymerization apparatus. The catalyst seed is an insoluble, apparently peroxidic material containing a substantial number of polymerization-inducing radicals. Growth of polymer from these catalyst seeds takes place from this plurality of radicals to form an intermeshed three-dimensional insoluble polymer having a characteristic shape from which the "popcorn" name is derived. This polymeric material is relatively brittle and of little use mechanically, and can neither be reconverted into monomers nor used in the preparation of final polymerization product.

Popcorn polymerization may likewise be initiated with the aid of a catalyst seed prepared by the exposure of certain materials such as tung oil, linseed oil and other drying oils to oxygen and light to form an insoluble material having a high peroxide or hydroperoxide content. These peroxides or hydroperoxides in the seed decompose to produce free radicals which can act on polymerizable monomers such as styrene, methacrylates or other polymerizable monomers to initiate the growth of polymer chains. Since these oxidized materials possess a plurality of polymerization-inducing radicals, many polymer chains may grow from a single molecule of the oxidized material and the resulting polymer comprises a plurality of chains intertwined with each other branching out from the oxidized molecule. The resulting structure is of the popcorn type by reason of this branching growth and is insoluble.

Since the polymer chains growing from the insoluble oxidized material are fixed at one end, we have found that termination reactions for the growing chain are negligible and extremely long chains are produced. Concurrently with the production of the insoluble polymeric branch chain polymer, other polymer is formed due to chain transfer of polymerization activity from a chain joined to the insoluble oxidized material to a monomer molecule. This chain transfer in the absence of chain transfer inducing materials proceeds at a relatively low rate so that the concentration of the polymerization-inducing radicals not attached to the insoluble oxidized material is relatively low and these materials can likewise attain a very long chain length. Ordinarily, the insoluble branched chain polymer constitutes the major proportion of the polymer formed and is of little use as such.

It is a feature of the present invention to produce a relatively high yield of very high molecular weight long chain linear soluble polymers.

It is a further feature to recover valuable long chain polymers from insoluble popcorn polymers.

In accordance with the present invention, polymerization of molecular materials having low chain transfer rate is carried out in the presence of an insoluble catalyst material having a plurality of radical forming polymerization-inducing groups to form an insoluble branch chain polymer. The linear polymer chains constituting the branches of the polymer are separated by rupture of the linkages of the original catalyst which joined the various polymer forming radicals of the catalyst.

Polymerization by the mechanism involving the action of a free radical on a monomer is believed to progress by the transfer of activity from the free radical to the monomer group last joined to the chain. In turn the activity at the end of the chain is transferred to the next monomer group joined to the chain and in this way chains are built up. Termination of chain growth may occur either by the interaction of two active chain ends to effect a juncture between two chains with the neutralization of the radical or by the transfer of the activity from a growing chain to a monomer molecule. The monomer molecule to which the activity has been transferred then serves as the commencement point for growth of another polymer chain. The frequency with which transfer of the polymer forming activity occurs varies with different monomers. In general it appears that the frequency of chain transfer is greater with monomers which possess a loosely bound atom, such as allylic compounds, vinyl acetate, and the acrylates. These monomers will not form popcorn polymer. For popcorn polymerization as required by the present invention monomers are selected which have a low rate of chain transfer during polymerization. Materials which form popcorn and hence may be considered to possess a low rate of chain transfer include styrene, orthochloro styrene, alpha vinyl naphthylene, butadiene, isoprene, methyl methacrylate, ethyl methacrylate, n-propyl methacrylate, n-butyl methacrylate, n-octyl methacrylate and lauryl methacrylate. It is possible to effect satisfactory polymerization using one or more of the low chain transfer rate monomers, but the presence of high chain transfer rate monomers interferes with satisfactory popcorn polymer formation.

In polymerization catalyzed by popcorn seed catalyst the initiation of polymerization apparently takes place by decomposition to free radicals of peroxide or hydroperoxide groups in the seed. Where the seed is insoluble and is suspended in contact with the monomer but not distributed homogeneously on a molecular scale, initiation of polymerization takes place only within the volume of each particle of the catalyst seed. Subsequent chain growth from the radical must then fill the interior and cover the surface of the seed with polymer. As the mass of catalyst seed and polymer can undergo only limited swelling the concentration of monomer available for polymerization is very much lower than would be indicated by the monomer consumed. Also, since one end of the growing chain is fixed in position and the other embedded in a matrix consisting essentially of polymer, the mobility of the free radical and of the chain is greatly reduced and the probability of a bi-molecular termination reaction is lessened. Under these circumstances extremely large molecules are formed since the rate of radical termination is small and chains can grow for comparatively long periods of time.

The separation of the long chains from the insoluble catalyst seed is effected by rupture of the seed to free the fixed end of the chain. Conveniently, catalyst seed is chosen in which this rupture is effected by relatively simple treatment. A preferred catalyst material lending itself to a simple treatment is an ester type material containing a plurality of radical forming groups disposed for separation by a rupture of the ester linkage as by saponification. Thus tung oil which has been subjected to oxygen and light for a period sufficient to convert it to an insoluble condition with formation of a plurality of hydroperoxidic groups has been found particularly satisfactory. This material is essentially an ester of three molecules of a multiply unsaturated acid with a polyhydric alcohol, i. e. glycerine. Other similar materials such as oxidized drying oils including linseed oil may be used. Other useful catalytic materials include insoluble oxidized multiply unsaturated polyfunctional polyesters such as oxidized tri-glycerides, pentaerythritol esters, sorbitol esters and the like.

Polymerization is carried out by maintaining the monomeric material in contact with the insoluble catalyst. The monomeric material may be employed as such either in liquid or in gaseous condition or may be dissolved in aromatic solvents such as benzene or toluene which do not effect the rate of chain transfer appreciably. In general there will be employed from 0.5% to 10%, preferably 1.25 to 6.25%, by weight of the catalyst based on the weight of the monomeric material. The percentage by weight of catalyst selected will depend upon the hydroperoxide strength of the catalytic material and also on the rate of polymerization desired. Higher percentages of catalyst give higher rates of polymerization but lower molecular weights. The rate of polymerization is less where the monomer is employed in solution form, decreasing proportionally to the concentration of monomer. It has been found undesirable to use a monomer concentration less than 60%.

Polymerization is ordinarily carried out at a temperature from 45° C. to 50° C. although temperatures as high as 150° C. have been employed. Polymerization proceeds more rapidly at high temperature but the product has a lower molecular weight.

A closed reactor is usually employed for the polymerization. A novel denser popcorn polymer may be obtained by carrying out the polymerization under mechanical pressure or the pressure of an inert gas such as nitrogen. Pressures as high as about 2600 lbs. have been employed. It is not, however, necessary to the formation of high molecular weight polymers that the polymerization be carried out under pressure. Upon completion of the polymerization, the product may be discharged into a body of an organic solvent such as benzene and the insoluble polymer separated from the solvent containing the majority of the soluble polymer by decantation. The insoluble polymer may then be washed with further solvent to remove traces of soluble material. The insoluble material in then dried.

The insoluble "popcorn" polymeric material is then treated as by hydrolysis or saponification to disrupt the bonds between the catalyst seed molecule and the polymer chains. Where an ester type catalyst is employed this disruption may be carried out by saponifying the polymer suitably by the use of an alkali metal hydroxide in organic solvent solution. The linear polymer chains thus separated are dissolved in the solvent and are precipitated therefrom by first neutralizing the solvent with acid and then adding a non-solvent such as methanol to the reaction mixture. The polymer may be purified by further solution and reprecipitation.

The polymer so obtained will have a molecular weight approaching the maximum theoretical molecular weight obtainable from the monomer at the particular temperature employed for the polymerization. This molecular weight is the ratio of the rate constants for chain growth and transfer.

The polymer so obtained from styrene may have a molecular weight ranging from as low as 90,000 for polymerizations carried out at a higher temperature and high catalyst concentration up to as high as over 2,000,000 for polymerizations carried out at lower temperatures and with lower catalyst concentrations. These molecular weight values are determined by viscometric means using the constant of Goldberg, Hohenstein and Mark published in the Journal of Polymer Science, vol. 2, page 503 (1947).

The following examples are given as of possible assistance in understanding the invention and it is to be understood that the invention is not restricted to the reagents of reaction conditions set forth in the examples:

*Example I.*—An insoluble catalyst was prepared by exposing a one-eighth inch layer of tung oil to air and sunlight for a period of eight weeks. The oxidized oil was then extracted repeatedly with benzene until no further soluble material was removed. The residue was air dried and ground with Dry Ice to 60 mesh in a Wiley mill.

Ninety parts by weight of styrene and 4.5 parts by weight (5%) of the above prepared tung oil catalyst seed were placed in a glass reaction vessel. The free space of the vessel was filled with nitrogen and the vessel was then sealed and subjected to a temperature of 90° C. for aproximately eight hours. A popcorn polymer product was obtained having a specific gravity of 0.8 and comprised a mixture of insoluble branched chain polymer and soluble linear polymer. The linear polymer constituted about one-sixth of the total product.

The polymerization product was discharged from the reaction vessel into approximately ten times its volume of benzene. The linear polymer dissolved and was separated from the insoluble polymer by decantation. This linear polymer was recovered by evaporating the benzene from the solution. The insoluble polymer was then further washed with warm benzene to remove traces of soluble material. The insoluble material was then dried at 60° C.

The insoluble polymer was introduced into a mixture of equal parts of butanol and xylene and a weight of sodium hydroxide equivalent to the weight of the insoluble polymer was added to the mixture. The mixture was refluxed for 24 hours with intermittent stirring to saponify the catalyst seed and effect solution of the polymer chains. The mixture was then acidified with concentrated HCl and the dissolved polymer precipitated by addition of methanol. The precipitated polymer was filtered off, dissolved in benzene, filtered, and then reprecipitated by adding the benzene solution dropwise to methanol.

The intrinsic viscosity of the polymer thus obtained was determined in toluene at 27° using an Ostwald type viscosimeter. The molecular weight was calculated from the relation $[\eta]=KM^a$. The values for "K" and "a" employed were those proposed by Goldberg, Hohenstein and Mark above referred to ($K=3.7\times10^{-4}$, $a=0.62$). An intrinsic viscosity of 1.23 corresponding to a molecular weight of 480,000 was obtained.

The intrinsic viscosity was also determined for the polymeric material separated by solution from the insoluble polymeric material. The intrinsic viscosity was found to be 1.59 corresponding to a molecular weight of 720,000.

*Example II.*—The procedure of Example I was repeated using only 2.5 parts by weight of catalyst seed, a polymerization temperature of 45° C. and a polymerization period of 37 hours.

The product obtained by precipitation of the saponified polymeric material had an intrinsic viscosity of 3.20 corresponding to a molecular weight of 2,240,000.

The soluble polymer extracted from the insoluble polymeric material had an intrinsic viscosity of 3.4 corresponding to a molecular weight of 2,450,000.

*Example III.*—80 parts of styrene mixed with 20 parts of benzene and five parts of catalyst seed prepared as in Example I were added to the solution. The mixture was heated to a temperature of 60° C. for 72 hours in a glass lined receptacle.

Upon separation and saponification of the insoluble polymer, the product obtained was found to have an intrinsic viscosity of 2.30 corresponding to a molecular weight of 1,320,000.

The soluble polymer recovered from solution in the benzene had an intrinsic viscosity of 2.23 corresponding to a molecular weight of 1,220,000.

Having described our invention what we claim as new and desire to secure by Letters Patent of the United States is:

1. A process for the manufacture of long chain polymers which comprises disposing a body of "pop-corn" structure-forming polymerizable monomer selected from the group consisting of styrene, orthochloro styrene, alpha vinyl naphthylene, butadiene, isoprene, methyl methacrylate, ethyl methacrylate, n-propyl methacrylate, n-butyl methacrylate, n-octyl methacrylate and lauryl methacrylate and mixtures of these in contact with from 0.5% to 10% based on the weight of the monomer of an insoluble oxidized drying oil catalyst, said drying oil being the ester of glycerin with three molecules of a multiply unsaturated fatty acid having a plurality of peroxidic radical-forming polymerization-inducing groups, maintaining said monomer in contact with said catalyst at temperatures not higher than 150° C. and in the absence of soluble catalyst to form an insoluble pop-corn polymer comprising linear chains joined to said catalyst, separating said insoluble polymer from the reaction mixture and saponifying said catalyst to separate said linear chains.

2. A process for the manufacture of long chain polymers which comprises disposing a body of styrene monomer in contact with 0.5% to 10% based on the weight of said monomer of an insoluble oxidized drying oil catalyst, said drying oil being the ester of glycerin with three molecules of a multiply unsaturated fatty acid having a plurality of peroxidic radical-forming polymerization-inducing groups, maintaining said monomer in contact with said catalyst at temperatures not higher than 150° C. and in the absence of soluble catalyst to form an insoluble popcorn polymer comprising linear chains joined to said catalyst, separating said insoluble polymer from the reaction mixture and saponifying said catalyst to separate said linear chains.

3. A process for the manufacture of long chain polymers which comprises disposing a body of styrene in contact with 0.5% to 10% based on the weight of the styrene of an insoluble oxidized tung oil catalyst comprising a plurality of peroxidic radical-forming polymerization-inducing groups, maintaining said styrene in contact with said catalyst at temperatures not higher than 150° C. and in the absence of soluble catalyst to form an insoluble polymer comprising linear chains joined to said catalyst, separating said insoluble polymer from the reaction mixture and saponifying said catalyst to separate said linear chains.

References Cited in the file of this patent

UNITED STATES PATENTS

| Number | Name | Date |
|---|---|---|
| 1,910,846 | Maximoff | May 23, 1933 |
| 1,975,959 | Lawson | Oct. 9, 1934 |
| 2,280,242 | Kropa | Apr. 21, 1942 |
| 2,319,576 | Agens | May 18, 1943 |
| 2,388,319 | Fuller | Nov. 6, 1945 |
| 2,424,851 | Rudoff | July 29, 1947 |